United States Patent [19]

Byford

[11] 4,157,804
[45] Jun. 12, 1979

[54] FISHING ROD HOLDER

[76] Inventor: Robert Byford, 7756 California-Apt. 514, Riverside, Calif. 92504

[21] Appl. No.: 864,160

[22] Filed: Dec. 27, 1977

[51] Int. Cl.² ............................................. A01K 97/10
[52] U.S. Cl. ..................................... 248/512; 248/518; 248/539; 248/226.2
[58] Field of Search ................. 43/21.2; 248/511, 512, 248/513, 518, 519, 530, 531, 534, 535, 539–541, 226.3, 226.3, 214

[56] References Cited

U.S. PATENT DOCUMENTS

| D. 179,525 | 1/1957 | Porter | 43/21.2 X |
|---|---|---|---|
| 1,893,702 | 1/1933 | Glenn | 248/226.2 |
| 3,006,588 | 10/1961 | Lemi | 248/512 |
| 3,802,112 | 4/1974 | Banner | 248/514 X |
| 3,848,838 | 11/1974 | Thomas | 248/226.3 X |
| 3,888,354 | 6/1975 | Margolin et al. | 248/226.3 X |
| 3,891,173 | 6/1975 | Ellis et al. | 248/226.4 |
| 3,964,706 | 6/1976 | Adams | 248/534 X |
| 3,998,562 | 12/1976 | Gostling | 248/226.2 X |

FOREIGN PATENT DOCUMENTS 326090  1/1958  Switzerland ............................. 248/512

Primary Examiner—Lawrence J. Staab
Attorney, Agent, or Firm—Herbert E. Kidder

[57] ABSTRACT

A support device for use in sport fishing to hold a plurality of fishing rods unattended. The device has at least two clamps or brackets to anchor the device securely to a railing on a boat, or the holder may be secured to the deck, after first removing the clamps. The fishing rods will be retained adequately enough within the device to permit the user to leave the fishing rod unattended in the device while trolling, with the fishing line trailing out behind the boat.

3 Claims, 4 Drawing Figures

U.S. Patent
Jun. 12, 1979
4,157,804
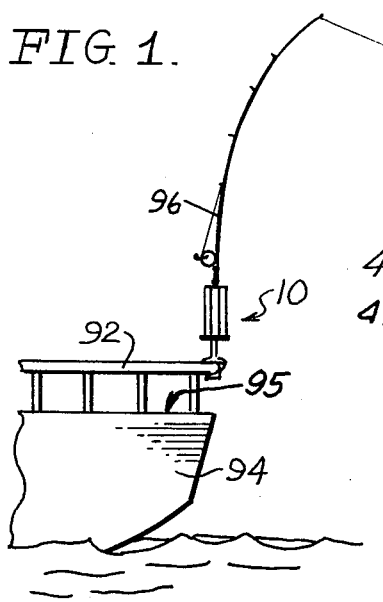
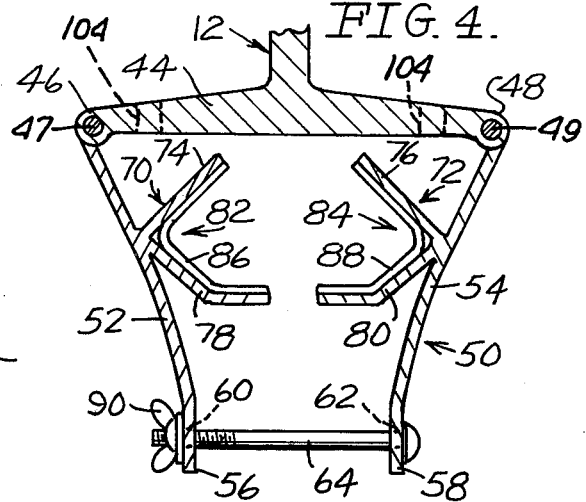
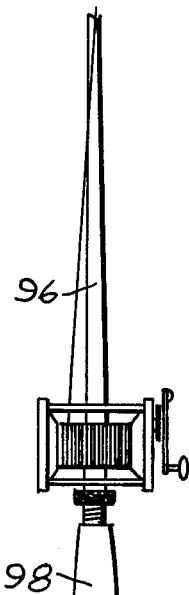
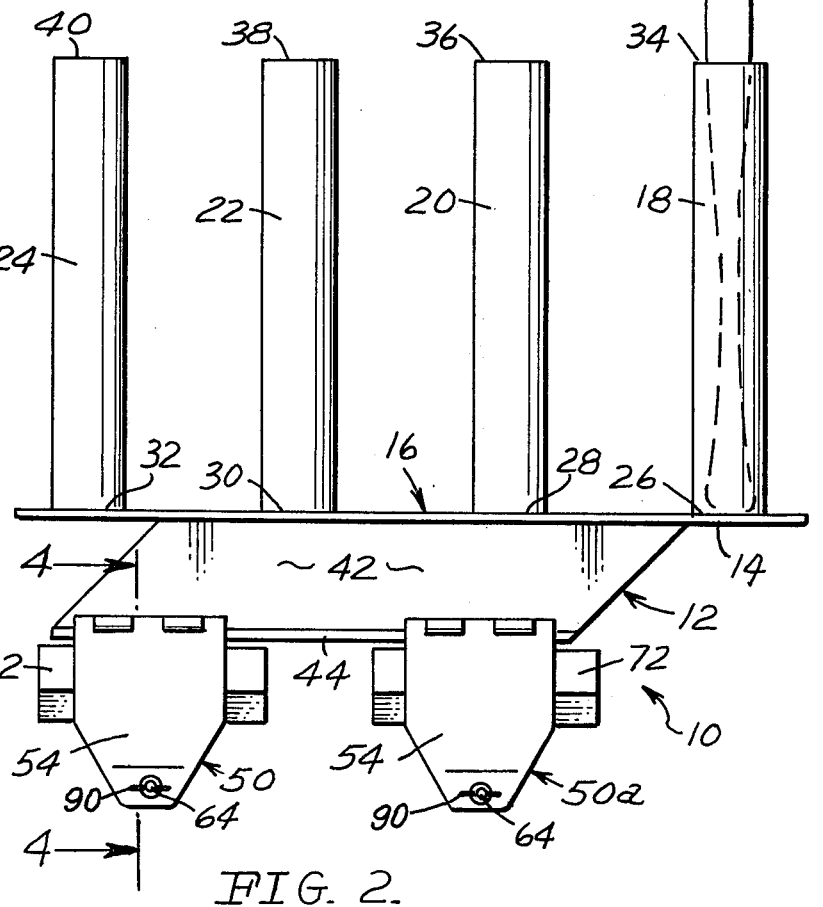

FISHING ROD HOLDER

BACKGROUND OF THE INVENTION

The present invention is directed to fishing devices and, more particularly, to an apparatus for supporting a plurality of fishing rods unattended for use in fishing.

As all who have been fishing are aware, a fishing rod can not only become tiring to hold while trolling, but also can become awkward to hold while baiting a hook, changing lures, or untangling lines. These problems become accentuated when several persons are fishing from one boat. Since the space available to position the fishing rods is limited, the fisherman often finds it very inconvenient to attend to the routine tasks associated with fishing, such as changing lures, or baiting the hook.

In most cases, when a fisherman becomes tired of holding or attending to his rod, he stops fishing to rest. In doing so, he may inadvertently miss some of the best periods of fishing. In the case of deep-sea fishing, several people may charter a boat to fish, and all time not used in actually fishing is money lost. Typically, public charter boats are quite crowded, and leave minimal room for each fisherman. This not only causes inconvenience while baiting hooks or changing lures, but also provides a greater potential for tangled lines.

Some prior art arrangements have utilized fishing rod holders to aid the fisherman, but these holders are typically incorporated in a swivel chair for deep-sea fishing. Other arrangements have permanently built-in pole holders which receive the fishing rods on a boat, to store the rods while the boat is moving to or from the fishing area, or while trolling.

Other prior devices receive only one fishing rod and are limited in the support that can be provided to the rod when a large fish might strike an unattended line.

None of the prior art arrangements provide a portable fishing rod support device to hold several fishing rods in such a manner that the rods will be adequately retained within the device when a large fish strikes an unattended line.

SUMMARY OF THE PRESENT INVENTION

The present invention comprises a support platform on which are mounted a plurality of hollow tubes to receive the handles of several fishing rods. Connected to the lower surface of the support platform are a pair of fore-and-aft-spaced clamping brackets for securely fastening the platform and tubes to a railing. The clamping brackets are adjustable to accommodate various sized railings.

With the use of the present invention a fisherman or group of fishermen on a sport fising boat can have the additional convenience of being able to put their rods in a rigid support or holder. This will provide them with the added freedom to move about more easily to bait their lines, change lures, or untangle the lines from one another. Furthermore, these fishermen can be relieved of the tiresome task of continually holding the typically large and heavy deep-sea fishing rod while trolling.

The unique placement of at least two fore-and-aft-spaced clamping brackets enables the device to grip the railing securely, and provides the necessary support and resistance to torsional stress caused by the pull of a large fish on a pole that is offset with respect to the clamps.

The fishing rod holder of the present invention can also be rigidly secured to the deck by screws or bolts, if desires, after first removing the clamps, as the base of the holder has a broad, flat bottom surface.

BRIEF DESCRIPTION OF THE DRAWINGS:

FIG. 1 is a partial elevational view of a boat, showing the fishing rod holder of the invention attached to the railing at the stern of the boat;

FIG. 2 is a front elevational view of the holder, showing a fishing rod carried in one of the tubes;

FIG. 3 is an end elevational view of the holder; and

FIG. 4 is a sectional view taken along the line 4—4 in FIG. 2.

DESCRIPTION OF THE PREFERRED EMBODIMENT

The fishing rod holder of the present invention is shown at 10 in FIG. 2, and has a base member 12 on which is positioned a flat, elongated, horizontal platform 14. Secured to the top surface 16 of the platform 14 is a series of hollow holder tubes 18, 20, 22 and 24, in spaced relationship with one another, with the longitudinal axes of the tubes being generally perpendicular to the platform. The lower ends 26, 28, 30 and 32 of the respective tubes 18, 20, 22 and 24 are attached to the platform 14, while the upper ends 34, 36, 38 and 40 are open to receive the handle end of a fishing rod.

The base, or riser member 12 is preferably made integral with the platform 14 to form the H-section shown in FIG. 3, with a central web 42 extending down to a lower horizontal flange member 44 generally parallel with the platform 14. Attached to the outer edges 46 and 48 of the flange 44 of the base member are a pair of clamping brackets 50 and 50a, as shown in FIG. 2, which are spaced from one another along the base member 12. Each of brackets 50, 50a has the same configuration. It is also contemplated, however, that in some cases the clamping brackets 50 and 50a might be connected directly to the platform 14 and eliminate the need for the riser 12. Although the present discussion will be directed to only one bracket 50, comparable parts of bracket 50a have the same numerical designations, with a suffix "a".

With respect to FIGS. 2 and 4, clamping bracket 50 has a pair of opposed flange or hinge plates 52 and 54 which are pivotally connected to the outside edges 46 and 48 of the flange 44 of base member 12, by respective hinge pins 47 and 49. Each plate 52 and 54 has a somewhat concave configuration, with the two plates curving or bowing inwardly toward one another when they are positioned as in FIG. 4. The bottom edge portions 56 and 58 of each respective plate 52 and 54 have apertures 60 and 62, to receive threaded mounting bolts 64.

Connected to the approximate midsections of the interior surfaces of plates 52 and 54 are generally V-shaped clamp members 70 and 72. Each clamp member 70, 72 has a straight upper flange portion 74 and 76, respectively, forming one side of each clamp, while the other portion of each clamp is formed by a bent-angle flange 78 and 80. The portions 82 and 84 of the respective bent-angle flanges 78 and 80 which are closest to one another in the orientation of FIG. 4 are generally parallel to the platform member 14, as shown in FIG. 2.

The generally V-shaped configuration of clamp members 70 and 72 in FIG. 4 is to enable them to grip the sides of a boat rail, guard rail or some similar type of cross member within the interior areas 82 and 84 of the respective clamp members 70 and 72. Cushion pads 86 and 88 are cemented to the inner surfaces of clamp members 70 and 72 to provide protection for the boat rail and also to provide increased friction so as to enhance the gripping of the clamping brackets to a railing. A wing nut 90 is screwed onto the bolt 64 to provide means to tighten or loosen the grip of the clamping brackets on a railing.

As shown more clearly in FIG. 2, the flange plates 52 and 54 are tapered downwardly toward the bolt 64. In addition, the flange plates 52 and 54 extend a sufficient distance below the lower flange member 44 of the base member 12 so that greater leverage can be obtained around the railing to which the device is to be attached, thereby increasing the gripping force, as will be explained below.

Turning to the use of the present invention, attention is directed to FIG. 1, which shows the fishing rod holder device 10 securely clamped to the railing 92 of a fishing boat 94. Positioned in one of the holder tubes is a fishing rod 96. In discussing the operation of the device, reference will be made to only one rod, and only one clamping bracket 50. However, it will be understood that a similar operation is also used with reference to clamping bracket 50a.

When a location on the railing has been selected, the wing nut 90 and the anchoring bolt 64 are removed to permit the flange plates 52 and 54 to swing open to a sufficient degree to permit the railing to pass between the clamp members 70 and 72. The flange plates are then swung inwardly toward one another to engage the clamp members 70, 72 against opposite sides of the railing. The anchor bolt 64 is reinserted through the apertures 60 and 62 of flange plates 52 and 54, and wing nut 90 is tightened up to clamp the holder to the railing. Because the flange plates 52 and 54 extend below the base member 12 a considerable distance, a greater mechanical advantage is obtained which allows the anchor bolt 64 and wing nut 90 to clamp the device 10 tightly to the railing.

The use of frictional padding material 86 and 88 in the clamp members 70 and 72 not only enhances the gripping of the device on the railing, but also protects the railing if it has a good wood finish or a polished metal finish, as found on some fishing boats.

Once the holder device is securely in place, one or more fishing rods can be placed with their handle ends 98 in the holder tubes 26, 28, 30 or 32, which are sufficiently deep to provide secure support. Although four tubes are shown in the present device, it is envisioned that any reasonable number could be used. The holder tubes allow the fishermen to easily bait hooks or change lures with two hands free, instead of using one hand to steady the rod.

In the case of heavier, deep-sea fishing rods, the fisherman can position the rod in the holder tube for trolling without the continued burdensome holding of the rod. By the use of the two large clamping brackets 50 and 50a, the rod holding device will securely hold an unattended fishing rod if a large fish should strike the line. Even if the rod receiving the strike by a large fish were in an end holder tube, tube 18 or 24 in FIG. 2, the two clamping brackets would withstand any torque on the rod holder device.

Although rod holder device 10 is shown with the base riser member 12, it is envisioned that the clamping brackets 50 and 50a could be hinged directly to the platform 14, eliminating the base riser member.

Another way of mounting the fishing rod holder on a boat would be to remove the hinge pins 47 and 49, which would allow the clamping brackets 50 and 50a to be detached. This would then allow the bottom flange 44 to lie flat against the deck, and screws could be passed through holes 104, to secure the flange to the deck. The advantage of this arrangement is that it provides the user with the option of either attaching the rod holder device to a boat railing or removing the holding clamps and attaching the rod holder device to a flat surface such as the boat deck.

The present invention is easy to engage and disengage, and can be moved from one location to another if desired. The device is portable, and may be carried along with other fishing gear, as it is preferably made of lightweight aluminum.

While I have shown and described in considerable detail what I believe to be the preferred form of my invention, it will be understood by those skilled in the art that the invention is not limited to such details, but may take various other forms within the scope of the claims.

I claim:

1. A portable fishing rod holder assembly for holding a plurality of fishing rods on a boat, said assembly comprising:

an elongated, flat, horizontal platform member;

a plurality of hollow tubular holders mounted on the top surface of said platform member and projecting upwardly therefrom, said tubular holders being spaced apart from one another along the lengthwise dimension of said platform, each of said hollow tubular holders being open at the top end to receive the handle end of a fishing rod;

at least two clamping brackets connected to said platform member and attachable to a railing of the boat to securely anchor said assembly so as to allow unattended support of the fishing rods while fishing;

each of said brackets comprising two opposed hinged flange plates with one edge of each in spaced and aligned relationship with respect to each other and pivotally connected to said platform member;

two clamp members, one being attached to the inside face of one of said flange plates; and the other being attached to the inside face of the other of said flange plates and means connected to the free edge of each of said flange plates for moving said free edges of said plates toward each other, said clamp members engaging said railing on opposite sides thereof, and said moving means securing said clamp members on said railing.

2. A portable fishing rod support assembly as defined in claim 1, which additionally comprises means within said clamp members for cushioning said engagement of said clamp members with said railing and for increasing the frictional gripping of the clamp members on the railing.

3. A portable fishing rod support assembly as defined in claim 1, wherein said moving means comprises a threaded bolt and nut.

* * * * *